United States Patent [19]

Funderburk et al.

[11] Patent Number: 5,794,655

[45] Date of Patent: Aug. 18, 1998

[54] SWING-TYPE CHECK VALVE ASSEMBLY HAVING AN INTEGRATED VALVE SEAT AND VALVE HOUSING COVER

[75] Inventors: Robert Vernon Funderburk, Charlotte; Timothy Duane Price, Monroe, both of N.C.

[73] Assignee: Conbraco Industries, Inc., Matthews, N.C.

[21] Appl. No.: 806,116

[22] Filed: Feb. 25, 1997

[51] Int. Cl.[6] ................................................ F16K 15/00
[52] U.S. Cl. ................ 137/527; 137/454.6; 137/527.2; 137/527.4; 137/557; 251/337
[58] Field of Search ......................... 137/527.2, 527.4, 137/527, 512, 454.6, 557; 251/337

[56] References Cited

U.S. PATENT DOCUMENTS

| | | | |
|---|---|---|---|
| 730,463 | 6/1903 | Keyt | 137/527.2 |
| 1,399,791 | 12/1921 | Pierson . | |
| 1,871,536 | 2/1932 | Le Bus . | |
| 2,515,425 | 7/1950 | Restemeier | 137/527 |
| 2,556,277 | 6/1951 | Hill et al. | 137/527 |
| 2,626,124 | 1/1953 | McCarthy . | |
| 2,748,788 | 6/1956 | Duckstein . | |
| 2,770,314 | 11/1956 | Powell | 137/527.4 |
| 3,026,902 | 3/1962 | Ruhl, Jr. . | |
| 3,060,961 | 10/1962 | Conley | 137/527.2 |
| 3,259,144 | 7/1966 | Taplin | 137/557 |
| 3,276,465 | 10/1966 | Wyckoff . | |
| 3,283,772 | 11/1966 | Ensign | 137/527.4 |
| 3,313,458 | 4/1967 | Braun . | |
| 3,478,778 | 11/1969 | Curtiss et al. | 137/527.4 |
| 3,482,603 | 12/1969 | Outcalt . | |
| 3,604,453 | 9/1971 | Boitnott | 137/527 |
| 3,789,874 | 2/1974 | Hills | 137/527 |

(List continued on next page.)

OTHER PUBLICATIONS

NR-020 LS "REGEV" with Limit Switch.
A.R.I. Kfar Charuv "REGEV" Check Valve.
Febco Specification Sheet Model 850: Double Check Assemblly (Drawings SS 850–1 and SS 850–2).
Febco Specification Sheet Model 870: Double Check Assembly (Drawings SS 870–1 and 870–2).
Febco Model 880: Reduced Pressure Backflow Preventer (Drawing SS 880–2).
"Silver Bullet: Ames Model 2000 SS Double Check Backflow Preventer 3/4–2". General Instruction, Maintenance. Testing. and Parts Information. Ames Company, Inc.

*Primary Examiner*—Denise L. Ferensic
*Assistant Examiner*—Joanne Y. Kim
*Attorney, Agent, or Firm*—Kennedy Covington Lobdell & Hickman, L.L.P.

[57] ABSTRACT

A swing-check valve for controlling fluid flow includes a valve housing and a valve assembly connected to a removable cover of the valve housing for rigid positioning of the valve assembly within the interior of the valve housing. Moreover, the valve assembly includes as a modular unit a valve seat subassembly in addition to a clapper subassembly and a spring subassembly. The valve seat subassembly includes a valve seat that is frictionally disposed within a port of the valve housing for controlling fluid flow therethrough when the cover is fastened to the valve housing. The clapper subassembly includes a clapper pivotal between a first position in engagement with the valve seat for blocking fluid flow through the port and a second position for permitting fluid flow through the port. The spring subassembly includes a spring and a spring base engageable with the clapper subassembly for urging the clapper into the first position. In one embodiment, the clapper subassembly includes a roller which engages the spring base and, in another embodiment, the clapper subassembly includes a cam member which engages the spring base. No fasteners are provided for the valve assembly within the interior of the valve housing and, furthermore, upon the unfastening of the cover, the valve assembly can be removed as a single unit from the valve housing by simple manipulation and removal of the cover.

13 Claims, 4 Drawing Sheets

U.S. PATENT DOCUMENTS

| | | | |
|---|---|---|---|
| 3,817,273 | 6/1974 | Erwin, Jr. | 137/338 |
| 3,817,278 | 6/1974 | Elliott | 137/527 |
| 3,857,408 | 12/1974 | Rhodes et al. | 137/514 |
| 3,870,071 | 3/1975 | Graham et al. | 137/527 |
| 3,974,848 | 8/1976 | Wheatley | 137/102 |
| 3,996,962 | 12/1976 | Sutherland | 137/527.4 |
| 4,019,532 | 4/1977 | Schittek | 137/527 |
| 4,067,356 | 1/1978 | Kreuz | 137/527 |
| 4,141,381 | 2/1979 | Eminger | 137/527.2 |
| 4,188,973 | 2/1980 | Weise et al. | 137/527.4 |
| 4,203,467 | 5/1980 | Cardi | 137/557 |
| 4,249,563 | 2/1981 | Shaw | 137/315 |
| 4,259,983 | 4/1981 | Kessel | 137/527.2 |
| 4,552,174 | 11/1985 | Carl et al. | 137/527.2 |
| 4,569,636 | 2/1986 | Bauer et al. | 417/295 |
| 4,669,500 | 6/1987 | Strelow | 137/514 |
| 4,706,706 | 11/1987 | Page et al. | 137/527.8 |
| 4,989,635 | 2/1991 | Dunmire | 137/527 |
| 5,046,525 | 9/1991 | Powell | 137/512 |
| 5,072,753 | 12/1991 | Ackroyd | 137/527 |
| 5,146,949 | 9/1992 | Retzloff et al. | 137/527 |
| 5,236,009 | 8/1993 | Ackroyd | 137/527 |
| 5,327,933 | 7/1994 | Ishikawa et al. | 137/527.6 |
| 5,439,028 | 8/1995 | Meyer et al. | 137/556 |
| 5,503,176 | 4/1996 | Dunmire et al. | 137/15 |

SWING-TYPE CHECK VALVE ASSEMBLY HAVING AN INTEGRATED VALVE SEAT AND VALVE HOUSING COVER

FIELD OF THE INVENTION

The present invention relates to a check valve and, in particular, to an improved swing-check valve which is secured within a valve housing by attachment thereof to a removable cover of the valve housing and which includes a valve assembly having a valve seat subassembly.

BACKGROUND OF THE INVENTION

Check valves are well known in the valve industry and have been developed to control backflow of fluids carrying undesirable pollutants into a fluid supply. These valves have evolved to become highly specialized in their function and operation. However, these valves are similar in that they all contain spring loaded check valves that are biased towards the valve-closed position until fluid pressure acting on the checking members forces the valves open. Typically, a backflow preventer utilizes two check valves in a conventional serial combination for preventing the backflow of a fluid.

The pressure required to open a check valve is established by regulation and provides a minimum degree of protection against reverse flow. Furthermore, regulation governing backflow preventers requires that a check valve and associated parts must be removable for inspection and repair for field service without having to remove the valve housing from the fluid conduit system to which it is attached.

In a conventional design, the checking member is a poppet type check in which the movement of the checking member is linear and remains in the fluid path. The energy required to open these check valves must be provided by the fluid and is created at the source by, for example, a pump. The total energy of the fluid is reduced by friction within the pipes and other obstacles in the fluid conduit system which include these checking members that remain disposed directly in the fluid path once the check valves are open. This energy loss, also known as "headloss," is dissipated to the environment and therefore should be minimized in fluid conduit systems in order to preserve fluid pressure.

Many designs to reduce headloss resulting from poppet check valves have been proposed. One design uses a "swing-check" type design in which the checking member, also called a clapper, rotates about a fixed hinge pin. The swing-check valve is advantageous because it allows the checking member to move out of the path of fluid flow thereby reducing the headloss associated with conventional poppet-check valves. In addition, as is conventionally known, the clapper and spring assembly in these conventional swing-check designs can be oriented so that, as the clapper moves away from the valve-closed position, the torque produced by the spring force about the pivot axis of the clapper through the hinge pin is reduced, thereby further minimizing headloss.

Conventional swing-check valves used in backflow preventers generally incorporate the same components. Typically, the clapper in such valves creates a fluid seal across a valve seat, the valve seat including an opening through which fluid would otherwise flow. The valve seat is usually positioned adjacent a fluid inlet port in a valve housing of the fluid conduit system and typically is mounted by bolts to the valve housing. As the fluid flows through the valve seat, the clapper opens by rotating about a hinge pin that normally lies adjacent and parallel to the valve seat face.

Normally, a helical compression spring is used to exert force onto the backside of the clapper, and the quantity of water allowed to flow through the swing-check valve directly depends on the opening angle of the clapper and the spring pressure that acts to oppose this opening. Specifically, the spring usually is compressed between the clapper and some other rigid structure such as the valve housing, and fluid pressure must exceed a predetermined magnitude to overcome the spring force on the clapper in order to open the valve.

A recently invented toggle-linkage swing-check valve is disclosed in Ackroyd, U.S. Pat. No. 5,236,009, which includes a valve assembly having a clapper subassembly, spring subassembly, and valve seat subassembly connected together as a modular unit. A novel feature of the valve is the spring of the spring subassembly being pivotally mounted at opposite ends thereof to the valve seat subassembly and clapper subassembly for the reorientation of the spring force during movement of the clapper subassembly so that the resultant torque applied to the clapper decreases as the clapper moves away from the valve-closed position. The valve assembly is designed to be inserted into an inlet port of a valve housing so that the valve seat of the valve seat subassembly engages the inlet and fluid flow through the housing flows through the valve seat. In particular, as shown in FIG. 9, the valve seat (122), and thus the valve assembly (102), are secured in place by the insertion of two retaining wires (126) into a channel formed by aligned V-grooves (165,163) formed respectively in the valve housing (106) and in the valve seat (122). A disadvantage to the swing-check backflow preventer of Ackroyd is that when the valve requires maintenance, a cover of the valve housing must be removed and then the retaining wires must be removed so that the valve assembly can be manually disengaged from the inlet and then withdrawn from the valve housing. Installation of the valve includes the reverse steps.

Another toggle-linkage swing-check valve is disclosed in Dunmire, U.S. Pat. No. 4,989,635, which includes a valve assembly having a spring subassembly, clapper subassembly, and valve seat subassembly connected together as a modular unit. The spring subassembly is disposed between the clapper of the clapper subassembly and a wall of the valve housing which, preferably according to Dunmire, is a recess in the cover of the valve housing. Moreover, the spring subassembly is pivotally disposed within the recess and pivotally mounted to the clapper for urging the clapper into the valve-closed position so that the torque produced by the spring subassembly on the clapper actually decreases as the clapper pivots away from the valve-closed position. The clapper is attached to the valve seat subassembly which is mounted by bolts to the valve housing. A disadvantage to the swing-check valve of Dunmire is that replacement of the valve assembly consequently requires: (i) the removal of the housing cover; (ii) the removal of the bolts that attach the valve assembly to the valve housing; and (iii) then the withdrawal of the valve assembly from the valve housing with careful supervision of the spring subassembly, which becomes free to pivot about its attachment to the clapper once the cover is removed in step (i). The valve assembly of Dunmire thus presents an awkward handling situation when the valve assembly requires assembly, replacement, or maintenance.

Yet another design for swing-check valves includes the "Regev" valve manufactured by A.R.I. Kfar Charuv of Ramot Hagolan, Israel. The valve includes a valve housing having a spring assembly and a clapper assembly that are disposed adjacent an inlet port of a valve housing. The spring includes a spring base and the clapper assembly includes a clapper having a cam member that remains in continuous engagement with the spring base. The clapper is mounted to the valve housing by a hinge pin and the spring is disposed in a valve housing recess above the clapper assembly so that it is axially compressible in a direction perpendicular to fluid flow through the valve housing and forces engagement of the spring base with the cam member to force the clapper towards the valve-closed position. Moreover, even though the spring does not vary in its orientation during movement of the clapper as in the toggle-linkage designs discussed above, i.e., the spring is not pivotally mounted at its ends, nevertheless, the torque produced by the spring force on the clapper about the hinge pin is reduced as the clapper moves away from the valve-closed position thereby minimizing headloss. A disadvantage to the Regev valve is that, in order to replace any component of the valve assembly or replace the entire valve assembly itself, the entire valve housing must be removed from the fluid conduit system and replaced. Furthermore, comparing the Regev valve to the valves of Ackroyd and Dunmire, it will be immediately apparent that there is no valve assembly disposable within a valve housing in the Regev valve which can be removed from a fluid conduit system without removing the valve housing as required by backflow preventer regulation.

Accordingly, it is therefore an object of the present invention to provide an improved swing-check valve which can be easily and readily removed from and inserted into a valve housing of a fluid conduit system by simply removing and installing, respectively, a cover of the valve housing.

It is a further object of the present invention to provide an improved swing-check valve which includes a spring subassembly that is removably mounted to the valve housing cover and that is oriented for axial compression and expansion of the spring perpendicularly to the direction of fluid flow through the valve housing.

Yet another objective of the present invention is to provide an improved swing-check backflow preventer which utilizes two swing-check valves of the present invention in serial combination with one another.

SUMMARY OF THE INVENTION

Generally, a swing check-valve for controlling fluid flow in accordance with the present invention includes a valve housing having a port for fluid flow therethrough which has a removable cover for accessing the interior of the valve housing. A valve assembly is disposed within the interior of the valve housing for controlling the fluid flow through the valve housing and the valve assembly is fixed integrally to the cover for installation and removal of the valve assembly into and from the interior of the valve housing simultaneously with the installation and removal of the cover from the valve housing.

In particular, each swing-check valve of the present invention includes a valve housing having a port for fluid flow therethrough. The valve housing also includes a removable cover for accessing the interior of the valve housing. A valve assembly that is positionable within the interior of the valve housing for controlling the fluid flow through the valve housing is mounted to the cover so that removal of the valve assembly from the interior of the valve housing results when the cover is removed from the valve housing. The valve assembly itself includes in combination as a modular unit: a seat subassembly having a valve seat that is frictionally positionable within the port of the valve housing when the cover is mounted to the valve housing so that fluid flow through the port flows through the valve seat; a clapper subassembly having a clapper pivotable between a first position in abutting engagement with the valve seat for preventing fluid flow through the port and a second position out of engagement with the valve seat for permitting fluid flow through the port; and a spring subassembly that urges the clapper towards the first position.

In one feature of the swing-check valves of the present invention, the spring subassembly is removably mounted to the cover and is configured so that the spring axially compresses and expands perpendicularly to the direction of fluid flow through the valve housing.

In another feature of the swing-check valves of the present invention, the force of the spring subassembly acting on the clapper when in the first position produces a torque on the clapper that is greater than the torque produced on the clapper when the clapper is out of the first position.

In one embodiment of the swing-check valves of the present invention, the clapper subassembly includes a cam member that is attached to the clapper and the spring subassembly includes a piston-mounted compression spring and a spring base disposed between the spring and the cam member. Furthermore, the spring base includes a clapper engaging surface for engagement with the cam member for urging the clapper into the first position.

In another embodiment of the swing-check valves of the present invention, the clapper subassembly includes a roller attached to the clapper and the spring subassembly includes a piston-mounted compression spring and a spring base disposed between the spring and the clapper having a clapper engaging surface for engagement with the roller for urging the clapper into the first position.

In a backflow preventer of the present invention, two swing-check valves of the present invention are utilized in linear combination with one another in a conventional manner.

DETAILED DESCRIPTION OF EMBODIMENTS OF THE PRESENT INVENTION

The swing-check valves of the present invention will now be described in detail with reference to the swing-check backflow preventers 11 of FIGS. 1–4, with one embodiment of the swing-check valves being shown in FIGS. 1–2 and an alternative embodiment being shown in FIGS. 3–4, and with like reference numerals being used in referring to like structures in FIGS. 1–4. Moreover, two swing-check valves 10 of the present invention are provided in the backflow preventers 11 of FIGS. 1–4, with both valves 10 of each backflow preventer 11 sharing the same valve housing 12. This serial combination of two swing-check valves in a valve housing to form a backflow preventer is well known in the art and will not be described in detail herein, the present invention residing in the individual structure of each swing-check valve 10.

The swing-check valves of the present invention are generally shown at 10 with each swing-check valve 10 including a valve housing 12 and a valve assembly 14. The valve housing 12 of each backflow preventer 11 includes at least one housing cover 16 removably attached by bolts 13 to the valve housing 12 for accessing the interior 18 of the valve housing 12 and, as will be apparent, each valve assembly 14 preferably is attached to a separate cover 16 of the valve housing 12 in accordance with the present invention.

Each valve assembly 14 of the swing-check valve 10 includes a valve seat subassembly 20 having a valve seat 22 that is frictionally positionable within a port 24 of the valve housing 12 through which the fluid to be controlled by the swing-check valves flows (shown by arrows F). An o-ring 26 preferably is disposed about the valve seat 22 for the forming of a fluid seal between the valve seat 22 and the valve housing 12 so that fluid flow through the valve housing 12 flows through the valve seat 22 and does not leak around the valve seat 22. The valve assembly 14 of each swing-check valve 10 also includes a clapper subassembly 28 having a clapper 30 pivotally mounted by hinge pin 32 to the seat subassembly 20. The clapper 30 is pivotable between a first position I in which the clapper 30 engages the valve seat 22 and a second position II in which the clapper 30 is pivoted out of engagement with the valve seat 22. When in abutting engagement with the valve seat 22, the clapper 30 in the first position I forms a fluid-tight seal thereby blocking fluid flow through the valve seat 22. In particular, the clapper 30 preferably includes a rubber underside 31 which provides a sealing face with the valve seat 22. Conversely, when the clapper 30 moves out of the first position I, the fluid seal formed between the clapper 30 and the valve seat 22 is disbanded and fluid flow through the valve seat 22 is permitted.

A spring subassembly 34 is also included in each valve assembly 14 and itself includes a piston-mounted compression spring 36 and a spring base 38 disposed between the compression spring 36 and clapper subassembly 28 for urging the clapper 30 into the first position I. In particular, the piston-mounted compression spring 36 is received within a cylindrical spring compartment 40 in abutment against a surface 42 of the spring compartment 40. The spring compartment 40 further includes a piston 44 that extends through the compression spring 36 along its axial extent and that is slidably mounted to the spring compartment 40 for linear reciprocating movement through the surface 42 in the axial direction of the compression spring 36. Moreover, the piston 44 attaches at one end thereof to the spring base 38 so that the compression spring 36 is retained between the spring base 38 and the surface 42 of the spring compartment 40.

The spring subassembly 34, and in particular the spring compartment 40, includes an exterior threaded surface for screwing into a threaded bore 46 of the valve seat 22. The spring compartment 40 also extends through an opening in the cover 16 and is threaded to receive a top cap 48 which can be secured to the top of the spring compartment 40 extending above the cover 16 for securing the spring subassembly 34 to the cover 16 and for covering the end of the piston 44 while still allowing the slidable movement of the piston 44 through the surface 42. Furthermore, the piston 44 includes a stop member 50 within top cap 48 that is configured and sized to engage the spring compartment 40 to prevent the piston 44 from sliding entirely through the surface 42 and to thereby prevent compression spring 36 from expanding to its equilibrium length.

The bore 46 for receiving the spring compartment 40 is positioned so that the spring subassembly 34 lies generally above the clapper subassembly 28, and spring base 38 includes a clapper engaging surface 52 which the compression spring 36 urges into continuous contact with the clapper subassembly 28. Furthermore, the spring subassembly 34 is preferably oriented so that the compression spring 36 axially compresses and expands perpendicularly to the direction of fluid flow F through the valve housing 12.

Figure 1:
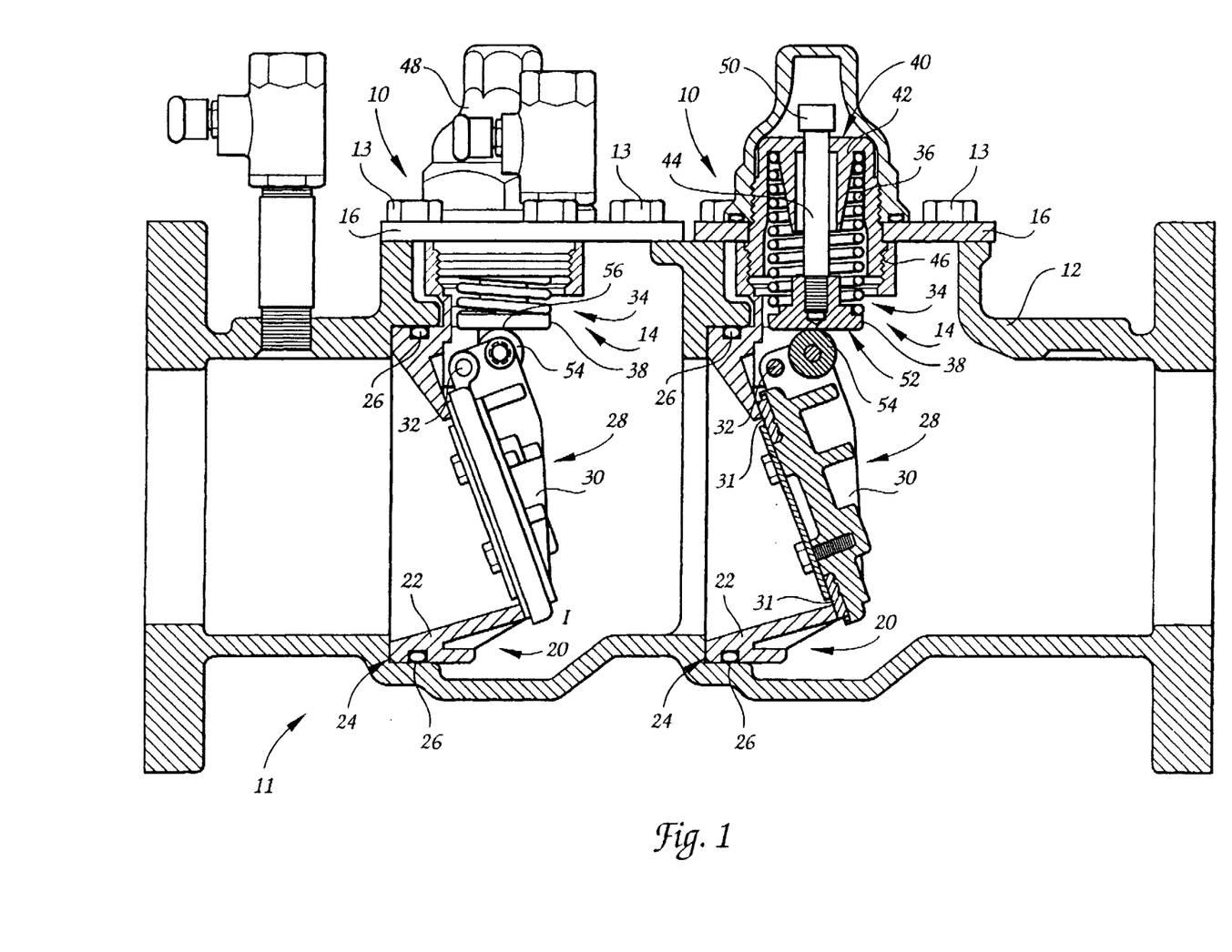
FIG. 1 is a side cross-sectional view of a backflow preventer including a valve housing having two swing-check valves of the present invention in the valve-closed position, with one of the swing-check valves itself being shown in cross-sectional view.
Figure 2:
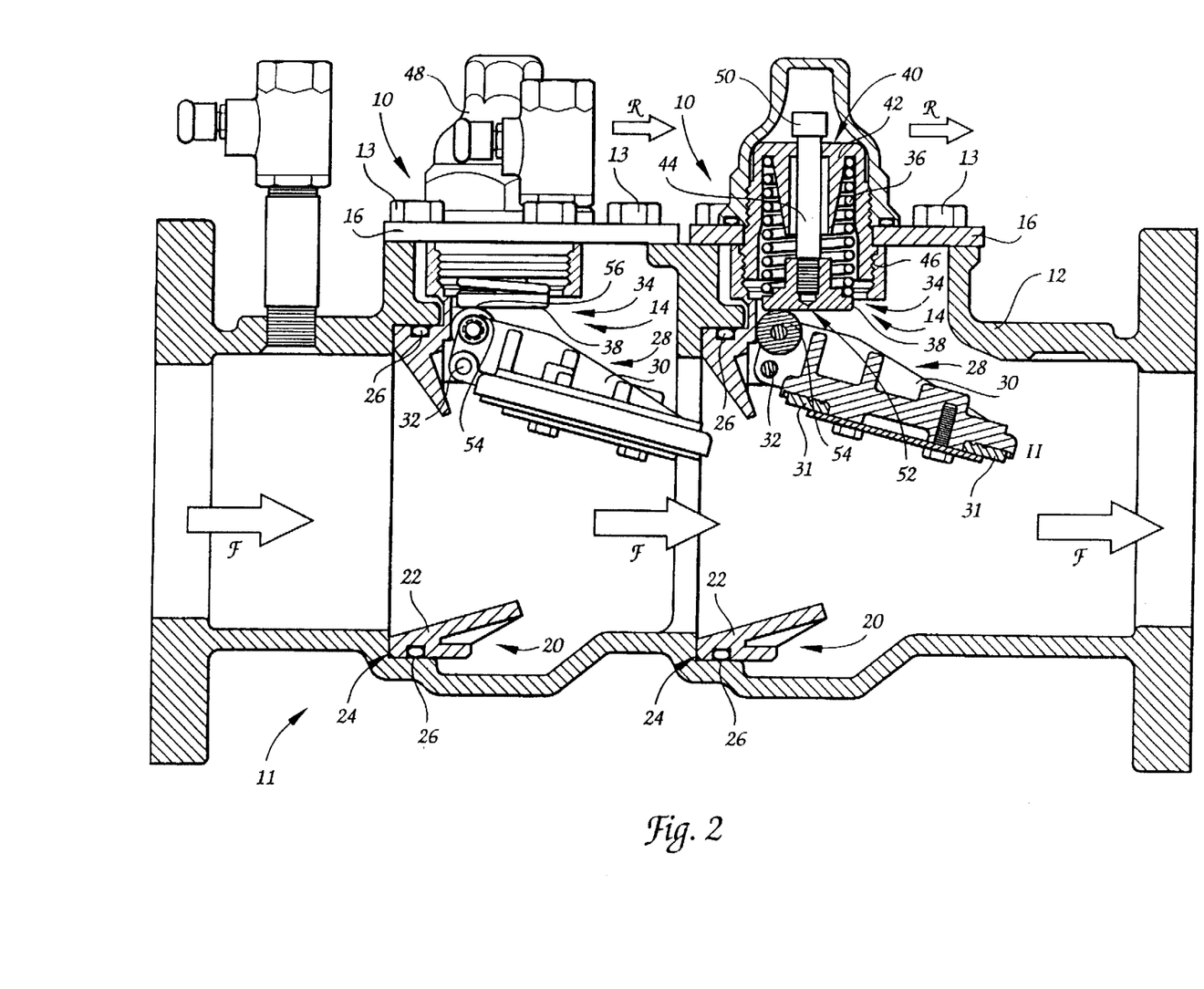
FIG. 2 is a side cross-sectional view of the backflow preventer of FIG. 1 showing the swing-check valves in the valve-open position.

In one embodiment of the present invention as shown in FIGS. 1–2, the clapper subassembly 28 and, in particular the clapper 30, includes a roller 54 for engaging the clapper engaging surface 52 of the spring base 38. Moreover, the roller 54 travels along the clapper engaging surface 52 and the point of contact 56 between the clapper engaging surface 52 and roller 54 continuously moves along the clapper engaging surface 52 during pivotable movement of the clapper 30.

Figure 3:
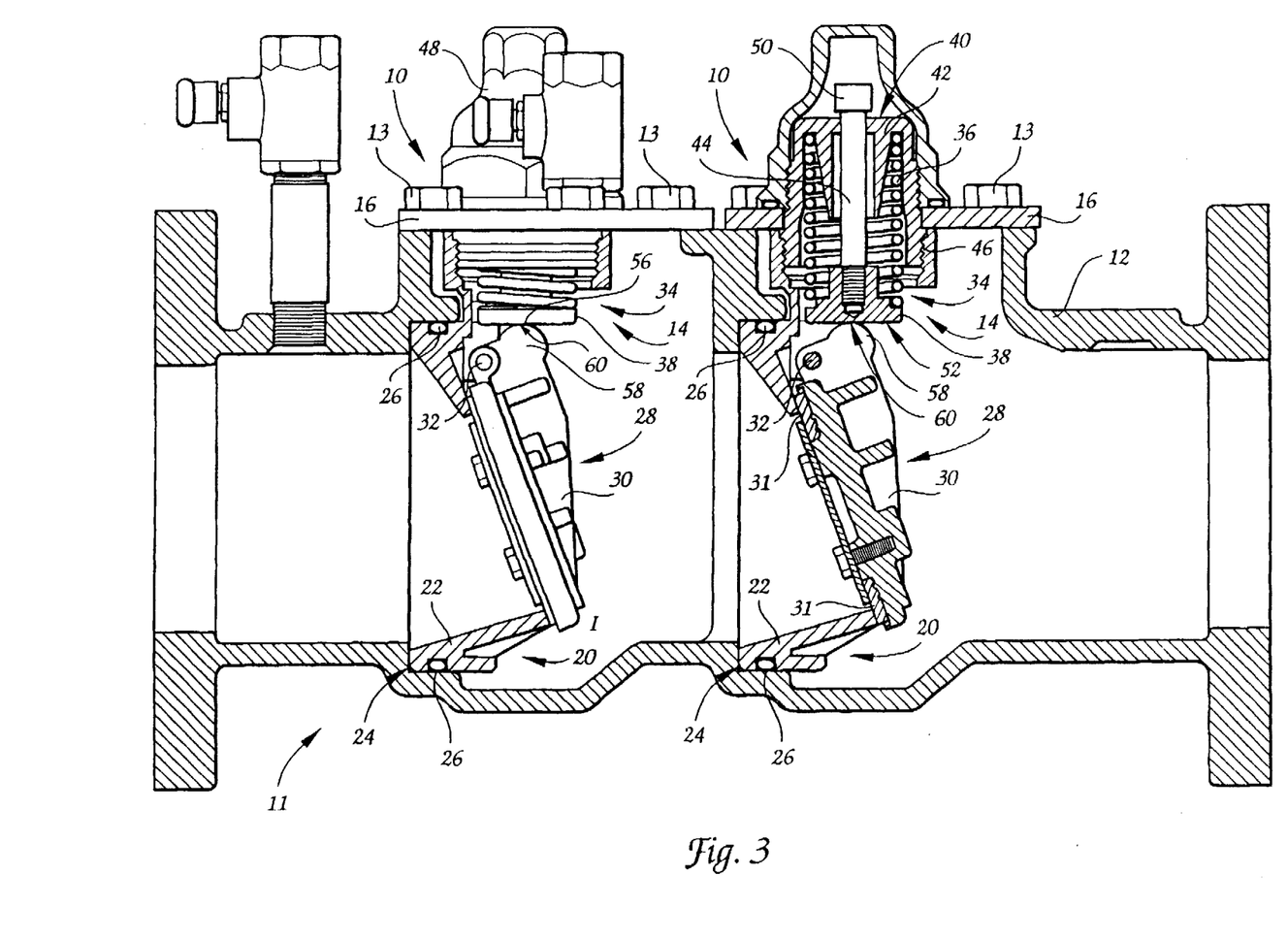
FIG. 3 is a cross-sectional view of a backflow preventer including a valve housing having two alternative swing-check valves of the present invention in the valve-closed position, with one of the swing-check valves itself being shown in cross-sectional view.
Figure 4:
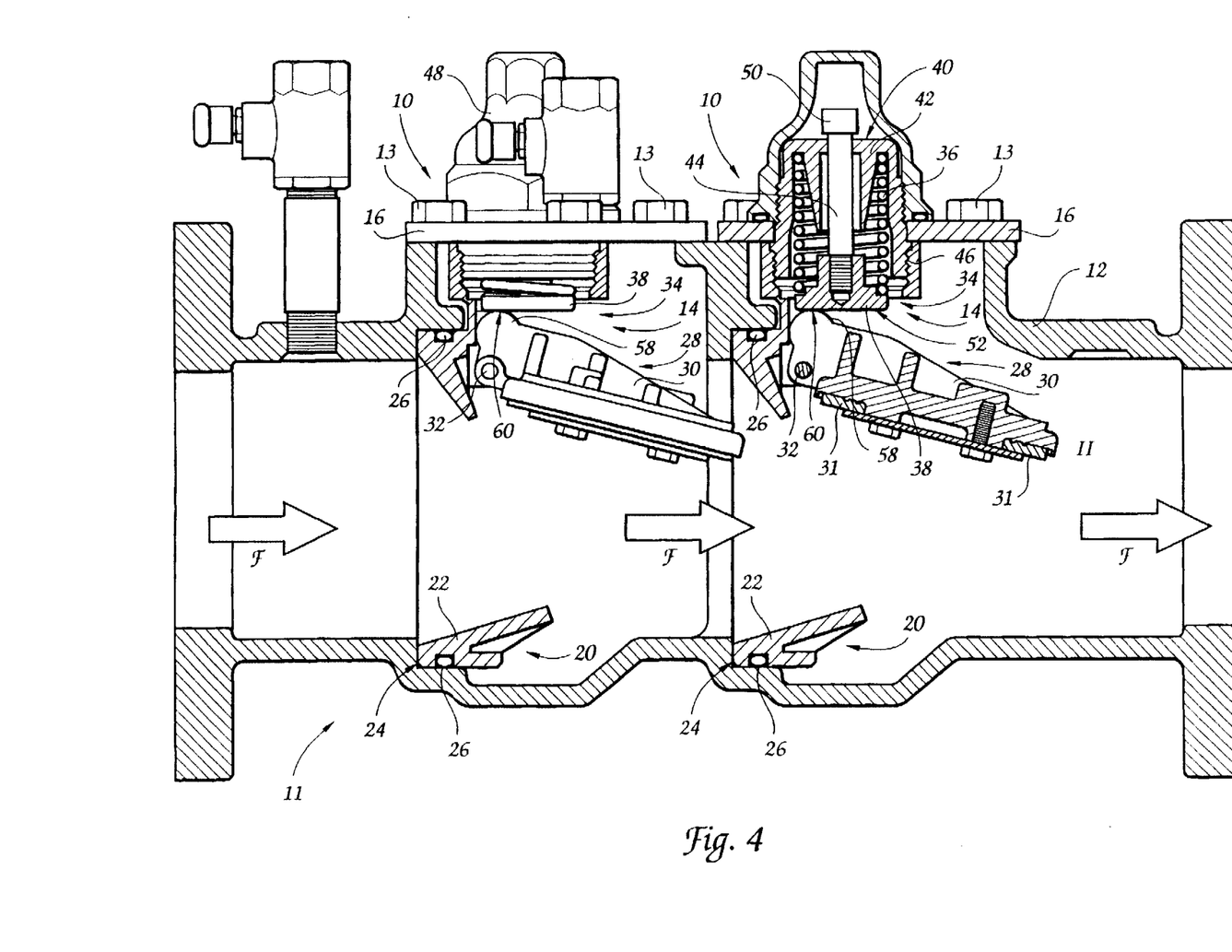
FIG. 4 is a side cross-sectional view of the backflow preventer of FIG. 3 showing the swing-check valves in the valve-open position.

In another embodiment of the present invention as shown in FIGS. 3–4, the clapper subassembly 28 includes a cam member 58 instead of roller 54 for engaging the clapper engaging surface 52 of the spring base 38. Furthermore, the cam member 58 is profiled so that the abutment 60 between the clapper engaging surface 52 and the cam member 58 continuously moves along the clapper engaging surface 52 during pivotable movement of the clapper 30. This embodiment including a cam member 58 is preferable where the parts of the spring and clapper subassemblies are made of small plastic parts and frictional forces therebetween are negligible.

In both embodiments, the compression spring 36 urges the clapper engaging surface 52 of the spring base 38 into contact with the roller 54 or cam member 58 so that the clapper 30 is urged towards the first position I. Furthermore, in both embodiments, the point of contact 56 or abutment 60 between the spring subassembly 34 and the clapper subassembly 28 continually extends further away from the hinge pin 32, and pivot axis extending therethrough, as the clapper 30 moves towards the first position I so that the torque produced by the spring subassembly 34 on the clapper 30 about the hinge pin 32 continually increases even though the compression spring 36 expands and consequently the spring force produced thereby decreases. Conversely, as the clapper 30 is forced open by fluid pressure and caused to pivotally move out of and away from the first position I, the spring force produced by the compression spring 36 increases but the point of contact 56 or abutment 60 between the spring subassembly 34 and the clapper subassembly 28 moves closer to the hinge pin 32 so that the torque produced on the clapper 30 about the hinge pin 32 continually decreases. Thus, the force of the spring subassembly 34 acting on the clapper 30 when in the first position I produces a torque that is greater than the torque produced by the spring subassembly 34 acting on the clapper 30 when the clapper 30 is out of the first position I. Moreover, when the clapper 30 is fully open, the clapper 30 should not be allowed to extend to the position where the spring force acts directly perpendicularly to the hinge pin 32 such that the torque would become zero. Preferably the roller 54 or the cam member 58 engages the valve seat subassembly 20 to prevent pivotable movement of the clapper 30 beyond a desirable distance away from the valve-closed position I (see FIGS. 2 and 4).

One of ordinary skill in the art will thus immediately recognize that the swing-check valves 10 of the present invention reduce the headloss associated with the valves 10 by decreasing the "hold-open" fluid pressure required to maintain each valve 10 in the open state after an initial fluid pressure is achieved. This benefit has been recognized, for example, in Dunmire, U.S. Pat. No. 4,989,635, discussed above.

When the swing-check valve 10 is used, a novel feature of the present invention of mounting the valve assembly 14, including the valve seat 22, to the housing cover 16 provides numerous advantageous over the prior art when installing and removing the valve assembly 14. In particular, when the valve 10 requires inspection, maintenance, or replacement, the process of removing the valve assembly 14 from the valve housing 12 requires only that the cover 16 be removed which is only attached to the valve housing 12 by bolts 13. Thus, removal of the cover 16 results in the removal of the valve assembly 14. Of course, once the cover 16 is unfastened from the valve housing 12, the cover 16 must be manipulated, i.e., transversely displaced horizontally in direction R shown in FIG. 1, so that the valve seat 22 is removed from its frictional engagement with port 24, but no other fasteners other than bolts 13 need be unfastened in the process. Once horizontally displaced, the valve seat 22 can then be lifted vertically out of the housing 12 while remaining mounted to the cover 16 at all times. This is a distinct advantage over the prior art valves, which do not include a valve assembly that can be removed from a valve housing simply by unfastening and removing the housing cover 16.

Moreover, each valve assembly 14 is preferably mounted to a separate housing cover 16 so that the removal of the cover 16 and valve assembly 14 attached thereto is simplified. However, as should now be apparent to one of ordinary skill in the art, two or more valves assemblies can be attached to a single cover in accordance with the present invention provided that each valve assembly is simultaneously and properly disposed within a port of the housing when the cover is attached to the valve housing.

Another important advantage of the present invention is the elimination of fasteners from the interior of the valve housing typically found in prior art valves. The elimination of interior fasteners for a valve assembly eliminates the need for additional machining of threaded bores, etc., for the fastening of the valve assembly to the valve housing within the housing interior, thereby reducing the complexity and expense of the manufacturing process. The swing-check valves of the present invention are also therefore easier to assemble, inspect, repair, and replace, thereby decreasing labor and service costs. Moreover, the swing-check valves of the present invention, by eliminating interior fasteners, eliminate likely places for corrosion to propagate in iron bodied valves that have an epoxy coating, thereby extending the service life of such valves.

In sum, the valve assembly of the swing-check valves of the present invention, which includes the spring subassembly, the valve seat subassembly, and the clapper subassembly combined together to form a single modular unit, and which is mounted to the valve housing cover, makes the swing-check valves of the present invention easier and simpler to assemble, maintain, and replace compared to all other conventional check valves. The cover acts as a sealed access while providing the rigid support that the swing-check valve requires to remain stationary in the port of the valve housing, and no fasteners are needed inside of the valve housing, since when the cover is fastened to the valve housing, the check valve has no degree of freedom to move, thereby keeping the valve seat in tight engagement within a housing port.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A swing-check valve for controlling fluid flow comprising:

a valve housing having a port for fluid flow therethrough, said valve housing including a removable cover for accessing an interior of said valve housing; and a valve assembly disposed within the interior of said valve housing for controlling the fluid flow through said valve housing and having a valve seat subassembly, said valve assembly including means for attaching said valve assembly to said cover for removal of said valve assembly from said interior of said valve housing simultaneously with removal of said cover from said valve housing.

2. A swing-check valve according to claim 1, wherein said valve assembly includes as a modular unit:

a seat subassembly including a valve seat that is frictionally positionable within the port of said valve housing when said cover is mounted to said valve housing so that fluid flow through the port flows through said valve seat, a clapper subassembly having a clapper pivotable between a first position in abutting engagement with said valve seat for preventing fluid flow through the port and a second position out of engagement with said valve seat for permitting fluid flow through the port, and a spring subassembly that urges said clapper towards said first position.

3. A swing-check valve according to claim 2, wherein said clapper engages said valve seat subassembly when in said second position to prevent further pivotable movement of said clapper away from said first position.

4. A swing-check valve according to claim 2, wherein said clapper subassembly includes a cam member attached to said clapper, and said spring subassembly includes a surface for engagement with said cam member for urging said clapper into said first position.

5. A swing-check valve according to claim 4, wherein said spring subassembly includes a compression spring and said spring subassembly is removably mounted to said cover to axially compress and expand perpendicularly to the direction of fluid flow through said valve housing.

6. A swing-check valve according to claim 4, wherein said spring subassembly includes a piston-mounted compression spring and a spring base disposed between said spring and said cam member, said spring base having said surface for engagement with said cam member.

7. A swing-check valve according to claim 4, wherein the force of said spring subassembly acting on said clapper when in said first position produces a torque that is greater than the torque produced by said spring subassembly acting on said clapper when said clapper is out of said first position.

8. A swing-check valve according to claim 2, wherein said clapper subassembly includes a roller attached to said clapper and said spring subassembly includes a surface for engagement with said roller for urging said clapper into said first position.

9. A swing-check valve according to claim 8, wherein said spring subassembly includes a piston-mounted compression spring and a spring base disposed between said spring and said clapper having said surface for engagement with said roller.

10. A swing-check valve according to claim 8, wherein said spring subassembly includes a compression spring and is removably mounted to said cover to axially compress and expand perpendicularly to the direction of fluid flow through said valve housing.

11. A swing-check valve according to claim 8, wherein the force of said spring subassembly acting on said clapper when in said first position produces a torque that is greater than the torque produced by said spring subassembly acting on said clapper when said clapper is out of said first position.

12. A swing-check backflow preventer comprising:

two swing-check valves disposed within a valve housing in linear combination with one another, said valve housing including two ports for fluid flow therethrough and at least one removable cover, and each swing-check valve including a valve assembly disposed within the interior of said valve housing for controlling the fluid flow through said valve housing, said valve assembly including means for attaching said valve assembly to said cover for removal of said valve assembly from said interior of said valve housing simultaneously with removal of said cover from said valve housing and further including as a modular unit a seat subassembly including a valve seat that is frictionally positionable within a port of said valve housing when said cover is mounted to said valve housing so that fluid flow through the port flows through said valve seat, a clapper subassembly having a clapper pivotable between a first position in abutting engagement with said valve seat for preventing fluid flow through the port and a second position out of engagement with said valve seat for permitting fluid flow through the port, and a spring subassembly that urges said clapper towards said first position.

13. A swing-check valve for controlling fluid flow comprising:

a valve housing having a port for fluid flow therethrough and including a removable cover for accessing an interior of said valve housing; and a valve assembly including a valve seat mounted directly to said cover and retained in fixed disposition within the interior of said valve housing only through said mounting to said cover and through frictional engagement between said valve seat and said port, whereby said valve assembly is removed from said valve housing simultaneously with removal of said cover from said valve housing.

* * * * *

UNITED STATES PATENT AND TRADEMARK OFFICE
CERTIFICATE OF CORRECTION

PATENT NO. : 5,794,655
DATED : August 18, 1998
INVENTOR(S) : Funderburk et al.

It is certified that error appears in the above-identified patent and that said Letters Patent are hereby corrected as shown below:

Col. 6, line 15, delete "50" and insert --so--

Col. 8, line 40 after "housing" insert --, said valve assembly being retained in the interior of said valve housing only through said attachment means and through frictional engagement between said valve seat subassembly and said port--.

Col. 10, line 9, after "of" insert --one--.

Col. 10, line 22, after "position" insert --,
said valve assembly being retained within the interior of said valve housing only through said attachment means and through frictional engagement between said valve seat and the port.--

Signed and Sealed this

Second Day of May, 2000

Attest:

Q. TODD DICKINSON

*Attesting Officer*         *Director of Patents and Trademarks*